3,313,713
RECOVERY OF A TRIOXANE FROM
DILUTE SOLUTIONS
Alfred William Martin, Corpus Christi, Tex., assignor to
Celanese Corporation, a corporation of Delaware
Filed Jan. 7, 1963, Ser. No. 249,573
8 Claims. (Cl. 203—92)

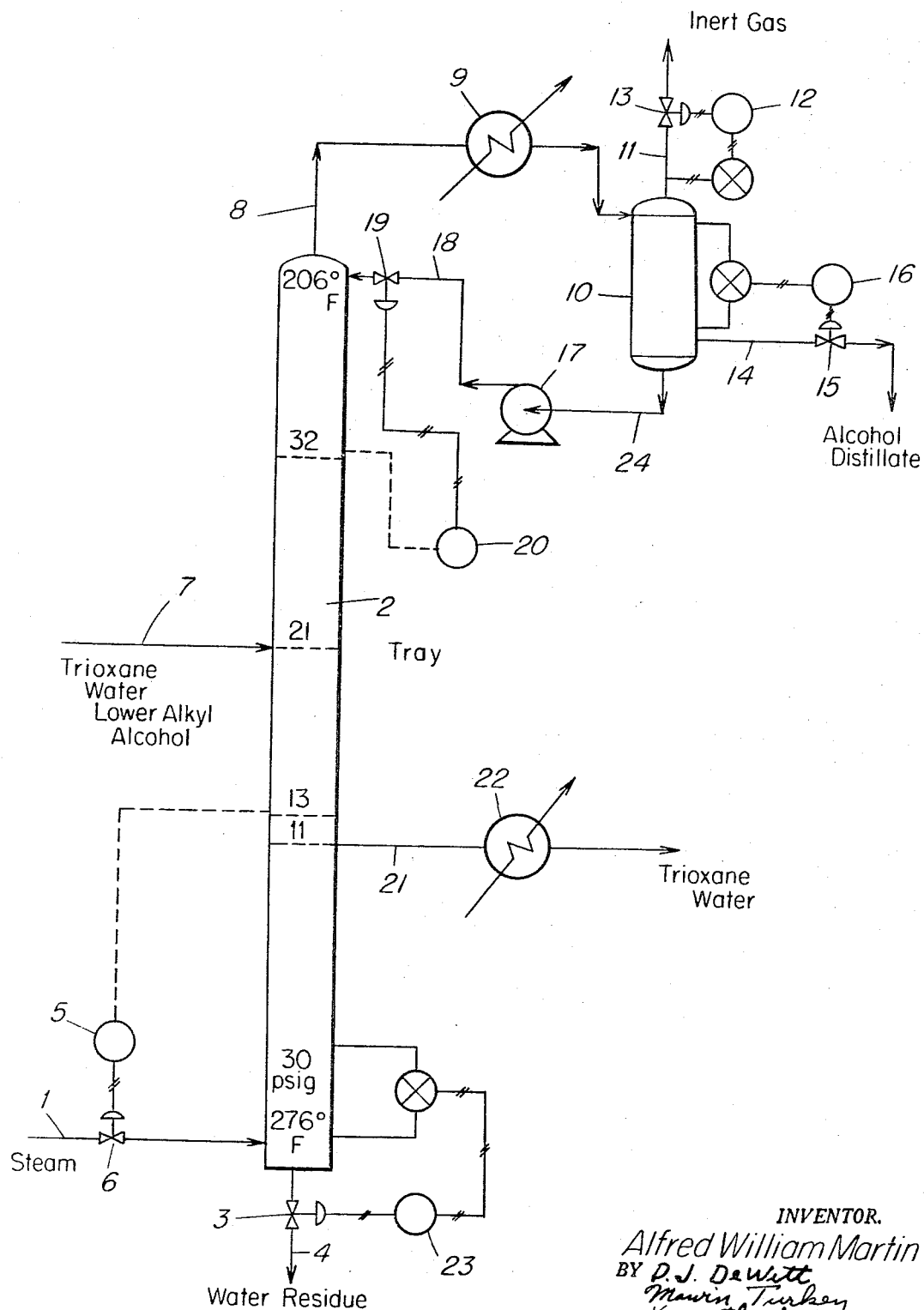

This invention relates broadly to the recovery of trioxane, specifically 1,3,5-trioxane (s-trioxane), from dilute solutions containing the same. More particularly the invention is concerned with a new and unobvious method of separating 1,3,5-trioxane from solutions thereof by an azeotropic-distillation technique. For purpose of brevity 1,3,5-trioxane is often referred to hereafter as "trioxane."

Trioxane may be recovered from a so-called "hydrolysis filtrate" or "hydrolysis solvent" that contains a minor amount of trioxane and a major amount of water and an organic solvent for trioxane, e.g., a volatile (volatilizable) alcohol. The alcohol may be, for instance, a lower alkyl alcohol which does not form a ternary azeotrope with water and trioxane such as one that contains from 1 to 6 carbon atoms, inclusive, e.g., methanol, ethanol, the various normal and isomeric propanols, butanols, etc. Advantageously the alcohol is methanol. Although the amount of organic solvent, specifically methanol, present in the hydrolysis filtrate or solvent may be as little as, for example, about 1% by weight, the economics of the process require not only that there be recovered a maximum amount of the trioxane contained in this filtrate or solvent but also a maximum amount of the methanol or other organic solvent that is also present therein.

The present invention is based on the discovery that trioxane can be separated from solutions thereof, more particularly solutions of trioxane in a volatile alcohol, specifically methanol, by a particular azeotropic-distillation technique. Based on the amount of trioxane and methanol in the charge of dilute solution of trioxane in methanol-water to the distillation column, the present invention has provided weight yields of over 98% trioxane and over 99% methanol.

Earlier technique for the recovery of trioxane and methanol from a trioxane-methanol-water solution, which does not form a ternary azeotrope, has generally involved a two-column (i.e., two distillation columns) system wherein methanol was recovered overhead from the first column and a water-trioxane azeotrope was taken overhead from the second column. This technique has the obvious disadvantages of increased capital cost for the installation of a two-column system, as well as increased cost for the required utilities, that is, for the cost of steam or other heating medium, water, electric power, etc.

It is a primary object of the present invention to provide an economical method for recovering the trioxane present in dilute solutions thereof such as, for example, solutions of trioxane in water and an organic solvent, e.g., methanol or other volatile alcohol, especially a lower alkyl alcohol; and, more particularly, a method whereby almost all (e.g., 90 weight percent or more) of the trioxane can be recovered from such solutions.

Another object of the invention is to provide an economical method for recovering substantially all of the methanol (or other volatile alcohol) from methanol-water solutions (or other volatile alcohol-water solutions) of a minor amount of trioxane.

Still another object of the invention is to provide means for carrying out the method of the invention with a minimum expenditure of capital for equipment.

Other objects of the invention will be apparent to those skilled in the art as the description of the invention proceeds. In this description methanol is specifically mentioned as illustrative of the volatile alcohol, more particularly a lower alkyl alcohol, that is present in a dilute solution of trioxane, together with water.

In practicing the present invention trioxane is recovered from a dilute solution thereof in methanol and water by continuously heating the said solution in a distillation zone, e.g., a single, substantially vertical distillation zone or column, having overhead, intermediate and residual points of discharge therefrom.

The pressure in the distillation zone or column may be atmospheric or superatmospheric, e.g., from 0 to 50 or more p.s.i.g. In order to minimize the size of the column and the overhead condenser, a pressure of between about 10 p.s.i.g. and about 40 or 50 p.s.i.g. is advantageously maintained on the column by conventional means. At 30 p.s.i.g. the temperature gradient or profile generally ranges between about 190° F. and about 290° F., the lower temperature being at or adjacent to the point of discharge of the overhead distillate and the higher temperature being at or adjacent to the point of discharge of the residue from the distillation zone. The methanol is continuously removed from the aforesaid distillation zone as an overhead distillate, while trioxane and water (i.e., a solution of trioxane in liquid water and/or water vapor) are continuously removed as a sidestream discharge at a point intermediate the points of overhead and residual discharges from the said zone. This sidestream discharge normally contains, especially under preferred operating conditions, almost all (e.g., 90 weight percent or more) of the trioxane present in the original charge to the aforesaid distillation zone. While the overhead distillate and sidestream discharge are being continuously removed, there is also being continuously removed from the distillation zone a residual discharge comprising mainly water.

When using, for example, a single, substantially vertical distillation column or tower, usually steam or other gaseous heating fluid is introduced into the bottom of the tower, which is provided with sieve trays or other suitable baffling elements. Any vapor-liquid contacting equipment known in the distillation art may be used.

The heating fluid, e.g., steam in any form (i.e., "live," superheated, saturated or wet) is fed to the chest of a re-boiler (thermosiphon or other type) located at the lower part (near the bottom) of the distillation column. The temperature of the steam is mainly a function of the reboiler design.

The feed of the methanol-water-trioxane solution is advantageously introduced to a point or tray in the column where the ratio of water and volatile alcohol, specifically methanol, is approximately the same as the ratio of water and methanol in the feed. Depending on this water-methanol ratio in the feed, this point may vary, for example, between about a mid-tray position and about two-thirds number of total trays from the base.

The temperature of the feed may vary, for instance, from ambient temperature to about 200° F. or higher. A feed-residue interheat exchanger can be used to maintain a level of about 200° F. as the temperature of the feed.

The minimum and maximum concentrations of volatile alcohol, specifically methanol, in the feed are not critical and affect only the column diameter and the boil-up required.

Ordinarily, the composition of the feed ranges, in percent by weight, from about 10% to about 40% of a volatile alcohol, specifically methanol, about 2% to about 15% trioxane, and the remainder water.

The reflux ratio $L/D$ depends, for example, upon the methanol-water ratio in the feed and the number of trays in the column. (The reflux ratio $L/D$ is commonly understood by those skilled in the art, L representing moles reflux and D representing moles distillate removed.) Any mode of operation of the tower or column that will reduce the residual methanol content to less than about 0.5 weight percent methanol will provide a high trioxane-content zone in the tower since the trioxane-water equilibrium is more favorable than the methanol-water equilibrium. Only the fact that methanol is more volatile than the trioxane-water azeotrope prevents trioxane from coming overhead in the tower. The usual reflux ratio $L/D$ is within the range of from about 1.3:1 to about 5:1, more particularly from about 2:1 to about 5:1, but trioxane recovery may be effected, with enough trays, at a reflux ratio of about 1:1.

The temperature gradient or profile of the distillation column is maintained by using temperature-recording controllers to control the flow of the heating fluid, e.g., steam, to the chest of a re-boiler in the base of the distillation column and, also, by using such controllers to control the overhead reflux ratios. Additional control can be effected, as desired or as conditions may require, by making appropriate adjustments in the rate of sidestream takeoff.

The overhead distillate is condensed, for example, by passage through a water-cooled condenser, and thence is passed through a suitable vessel which advantageously is maintained under the moderate pressure of an inert gas, e.g., nitrogen, helium, argon, etc. The inert gaseous atmosphere is maintained in this vessel primarily as a safety measure. The condensed distillate is withdrawn from a point near the bottom of this vessel while the residue from the vessel is charged back to the top of the distillation column.

The aforementioned sidestream discharge containing water and almost all of the trioxane contained in the original charge to the distillation unit is continuously removed from a point intermediate the points of overhead and residual discharges from the said zone. Advantageously this sidestream discharge, if wholly or partly in vapor state, is condensed by passing it through a condenser through which water at a temperature of about 120° F. to about 140° F., more particularly about 130° F., is circulated.

Taking a column 6 inches in diameter and having 42 sieve trays as illustrative of apparatus that can be used in practicing the present invention on a pilot-plant scale, it may be stated that best separation is obtained when the lower breakpoint is held at tray 13, the upper breakpoint is held at tray 32, and the temperatures between the feed point at tray 21 and tray 13 are held by adjusting the rate of sidestream takeoff. A low sidestream takeoff rate allows the trioxane peak to move up the column until it floods due to an excessive reflux rate. A high takeoff rate moves the trioxane peak down the column to the sidestream takeoff point, allowing the temperature to drop with resulting contamination of the sidestream with methanol. A sidestream containing less than 1 weight percent of methanol is obtained by holding the trioxane peak at about tray 15 while withdrawing a sidestream discharge from tray 11.

In order that those skilled in the art may better understand how the present invention can be carried into effect, the following examples are given by way of illustration and with reference to the figure in the drawing showing a distillation flow diagram and not by way of limitation.

All parts and percentages are by weight unless otherwise stated.

Example 1

The apparatus employed in this example is a 42-sieve tray, insulated column, 6 inches in diameter. Means 1 and 4 are provided at a side near the bottom of the column for charging gaseous heating fluid, specifically steam, to the chest of a re-boiler, and at the bottom of column 2 for discharging an aqueous liquid residue to sewerage. The valve 3 on the residue-discharge line is automatically controlled by a liquid indicating controller 23 so as to maintain a desired amount of aqueous liquid in the bottom of the tower; or, otherwise stated, so as to remove this residual liquid at a desired rate. A temperature-recording controller 5 which is connected so as to measure the temperature at, for example, tray 13 automatically controls the valve 6 on the steam-inlet line 1.

The feed is charged through line 7 at approximately the middle of the column of trays, more particularly at tray 21. At this tray, during operation of the column, the ratio of water and methanol is approximately the same as the ratio of water and methanol in the feed. An overhead distillate is removed from the top of the column through line 8. This distillate passes through a water-cooled condenser 9 and thence into a receiving tank 10 which is maintained under a moderate nitrogen pressure fed through line 11. A pressure-recording controller 12 automatically controls the valve 13 on the line from the nitrogen-supply source to the aforementioned receiving tank 10.

The condensed overhead distillate is removed through line 14 leading from a side near the bottom of this tank. A valve 15 on this distillate-discharge line is automatically controlled by a liquid-indicating controller 16 which indicates the level of liquid in the aforesaid receiving tank 10. Line 24 leading from the bottom of this tank is connected to pump 17 which recirculates a portion of the liquid in the said tank to the upper portion of column 9, entering the column through line 18 near the top. A valve 19 on this line is controlled by a temperature-recording controller 20 which is connected so as to measure the temperature at a tray near the top of the column, more particularly at tray 32.

A sidestream discharge is taken off through line 21 at a point intermediate the points of overhead and residual discharges from the distillation column, more particularly from tray 11. This discharge passes through a condenser 22 through which is circulated a warm heating fluid, specifically water at a temperature of about 130° F.

The distillation column was maintained under a pressure of 30 p.s.i.g. during the run.

The composition of the feed was as follows:

| | Weight percent |
|---|---|
| Methanol | 31.8 |
| Water | 57.4 |
| Trioxane | 10.2 |

The feed rate was 48 lbs./hr. For the composition of the particular feed employed, this is equivalent to:

| | Lbs./hr. |
|---|---|
| Methanol | 15.3 |
| Water | 27.6 |
| Trioxane | 4.9 |

The reflux ratio $L/D$ was about 2.4:1. The temperature profile was as follows:

| | ° F. |
|---|---|
| Base | 276 |
| Sidestream, tray 11 | 265 |
| Tray 13 | 258 |
| Overhead | 206 |

The duration of the run was 16 hours. The stated analyses are averages based on mass spectrographic results on three sets of spot samples taken at approximately 5-hour intervals during the run and on a 4-hour and a 10-hour composite of hourly spot samples. The results are summarized in Table I.

TABLE I

|  | Residue | | Sidestream | | Distillate | |
| --- | --- | --- | --- | --- | --- | --- |
|  | Weight Percent | Weight, Lbs./hr. | Weight Percent | Weight, Lbs./hr. | Weight Percent | Weight, Lbs./hr. |
| Stream Size | | 19.9 | | 12 | | 15.7 |
| Stream Composition: | | | | | | |
| Methanol | 0 | 0 | 0.9 | 0.1 | 92.3 | 14.5 |
| Water | 99.1 | 19.8 | 60.7 | 7.3 | 1.7 | 0.3 |
| Trioxane | 0.4 | 0.08 | 37.3 | 4.5 | 4.3 | 0.7 |

Recovery in percent, based on amount fed to column:

| | Percent |
| --- | --- |
| Trioxane | 98+ |
| Methanol | 99+ |

Although less satisfactory primarily from the standpoint of the capital investment and space involved, the method of the present invention also can be carried into effect using two or more towers or columns arranged in series. Such an arrangement of apparatus (with two columns in series) was used in Example 2 which follows.

*Example 2*

The two columns employed in this example contained a total of 72 sieve trays. On this basis the feed was to tray 46 and the sidestream was taken as a liquid from tray 11. The pressure on the column was 30 p.s.i.g. The temperature profile of the column was held by using temperature-recording controllers to control the steam to the base and the overhead reflux, and by withdrawing the sidestream at a constant rate.

The feed had the following composition:

| | Weight percent |
| --- | --- |
| Methanol | 31.1 |
| Water | 65.6 |
| Trioxane | 3.2 |

The feed rate was 85 lbs./hr. The reflux ratio $L/D$ was about 1.5:1. The temperature profile was as follows:

| | ° F. |
| --- | --- |
| Base | 273 |
| Sidestream, tray 11 | 266 |
| Tray 13 | 260 |
| Overhead | 205 |

The duration of the run was 9½ hours. The compositions of the residual, sidestream and distillate discharges are shown in Table II.

TABLE II

| | Residue | Sidestream | Distillate |
| --- | --- | --- | --- |
| Stream Compositions, weight percent: | | | |
| Methanol | 0 | 0.1 | 95.1 |
| Water | 99.6 | 40.0 | 0.9 |
| Trioxane | 0.1 | 57.8 | 4.0 |

The stated analyses are averages based on mass spectrographic data on four sets of spot samples taken at approximately 3-hour intervals during the run. The results were checked by mass spectrograph on 10-hour composites of spots taken at 1-hour intervals and by Karl Fischer water analyses and gas chromatographic trioxane analyses on selected samples.

It is to be understood that the foregoing detailed description is merely given by way of illustration and that many variations may be made therein without departing from the spirit of the invention.

Having described my invention what I desire to secure by Letters Patent is:

1. The method of recovering trioxane from a dilute solution thereof in a lower alkyl alcohol having from 1 to 6 carbon atoms and water which comprises:
   (a) continuously heating the said solution to a distillation temperature in a distillation zone having overhead, intermediate and residual points of discharge therefrom;
   (b) continuously removing the lower alkyl alcohol from the said zone as an overhead distillate;
   (c) continuously removing trioxane and water as a sidestream discharge at a point intermediate the points of overhead and residual discharges from the said zone; and
   (d) continuously removing from the said zone a residual discharge comprising mainly water.

2. A method as in claim 1 wherein the lower alkyl alcohol is methanol.

3. A method as in claim 1 wherein the distillation zone is a single distillation zone.

4. A method as in claim 1 wherein the distillation zone is a single, substantially vertical distillation zone.

5. A method of recovering trioxane from a dilute solution thereof in methanol and water which comprises:
   (a) continuously charging a feed of the aforesaid solution to a heated distillation zone having overhead, intermediate and residual points of discharge therefrom,
     said feed being introduced to said zone at a point between the aforesaid overhead and residual discharge points and at which the ratio of water and methanol is approximately the same as the ratio of water and methanol in the feed;
   (b) continuously removing methanol from the said zone as an overhead distillate;
   (c) continuously removing trioxane and water as a sidestream discharge at a point intermediate the points of overhead and residual discharges from the said zone,
     said sidestream discharge containing almost all of the trioxane present in the original charge to the said distillation zone; and
   (d) continuously removing from the said zone a residual discharge comprising mainly water.

6. A method as in claim 5 wherein the reflux ratio in the distillation zone is between about 1:1 and about 5:1.

7. A method as in claim 5 wherein the distillation zone is under a superatmospheric pressure of from about 10 p.s.i.g. to about 50 p.s.i.g.

8. A method as in claim 5 wherein the reflux ratio in the distillation zone is between about 1.3:1 and about 5:1 and the said zone is under a superatmospheric pressure of from about 10 p.s.i.g. to about 40 p.s.i.g.

References Cited by the Examiner

UNITED STATES PATENTS

| | | | |
| --- | --- | --- | --- |
| 2,281,243 | 4/1942 | Lansing | 203—96 |
| 2,565,569 | 8/1951 | McCants | 260—340 |
| 2,809,925 | 10/1957 | Nelson | 203—96 X |
| 3,003,929 | 10/1961 | Bright | 203—96 |
| 3,149,127 | 9/1964 | Platz | 260—340 |

NORMAN YUDKOFF, *Primary Examiner.*